(12) United States Patent
Hupke

(10) Patent No.: US 7,850,258 B2
(45) Date of Patent: Dec. 14, 2010

(54) INVENTORY STORAGE SYSTEM

(75) Inventor: Peter P. Hupke, Delavan, IL (US)

(73) Assignee: Caterpillar Inc, Peoria, IL (US)

( * ) Notice: Subject to any disclaimer, the term of this patent is extended or adjusted under 35 U.S.C. 154(b) by 841 days.

(21) Appl. No.: 11/640,578

(22) Filed: Dec. 18, 2006

(65) Prior Publication Data
US 2008/0143220 A1    Jun. 19, 2008

(51) Int. Cl.
*A47B 77/00* (2006.01)
(52) U.S. Cl. ........................ 312/108; 312/261
(58) Field of Classification Search ......... 312/107–108, 312/257.1, 258–261
See application file for complete search history.

(56) References Cited

U.S. PATENT DOCUMENTS

| | | | |
|---|---|---|---|
| 633,318 A * | 9/1899 | Horle | 312/330.1 |
| 1,148,238 A | 7/1915 | Kline | |
| 2,128,854 A | 8/1938 | Sagendorph et al. | |
| 3,606,506 A * | 9/1971 | Ungaro | 312/111 |
| 3,653,734 A * | 4/1972 | Ungaro | 312/107 |
| 3,743,372 A * | 7/1973 | Ruggerone | 312/108 |
| 4,071,286 A | 1/1978 | Moyer | |
| 4,433,883 A * | 2/1984 | Boender et al. | 312/234.1 |
| 4,470,647 A | 9/1984 | Bishoff et al. | |
| 4,508,231 A * | 4/1985 | Honickman | 211/199 |
| 4,771,907 A | 9/1988 | Torney | |
| 5,466,058 A * | 11/1995 | Chan | 312/107 |
| 5,497,888 A * | 3/1996 | Michaels et al. | 312/107 |
| 5,690,401 A * | 11/1997 | Franklin | 312/107 |
| 5,720,547 A | 2/1998 | Baird | |
| 6,578,937 B1 * | 6/2003 | Thoman | 312/107 |
| 2003/0164663 A1 * | 9/2003 | Chang et al. | 312/107 |

FOREIGN PATENT DOCUMENTS

| | | | | |
|---|---|---|---|---|
| DE | 3523784 | * | 1/1987 | 312/107 |
| DE | 3716643 | * | 9/1988 | 312/258 |
| EP | 166848 | * | 1/1986 | 312/259 |

* cited by examiner

*Primary Examiner*—Hanh V Tran
(74) *Attorney, Agent, or Firm*—Richard K. Chang; Miller, Matthias & Hull

(57) ABSTRACT

An inventory storage system may include a frame defining a plurality of storage levels and a first exterior sleeve supported by one of the storage levels. The first exterior sleeve may include a bottom wall, a first sidewall, a second sidewall, and a top wall. The inventory storage system may further include a first interior sleeve having an opening and disposed within the first exterior sleeve such that the first interior sleeve abuts at least one of the bottom wall, the first sidewall, the second sidewall, and the top wall. The inventory storage system may also include a second interior sleeve disposed within the first exterior sleeve, the first interior sleeve abutting the first interior sleeve and at least one of the bottom wall, the first sidewall, the second sidewall, and the top wall.

16 Claims, 4 Drawing Sheets

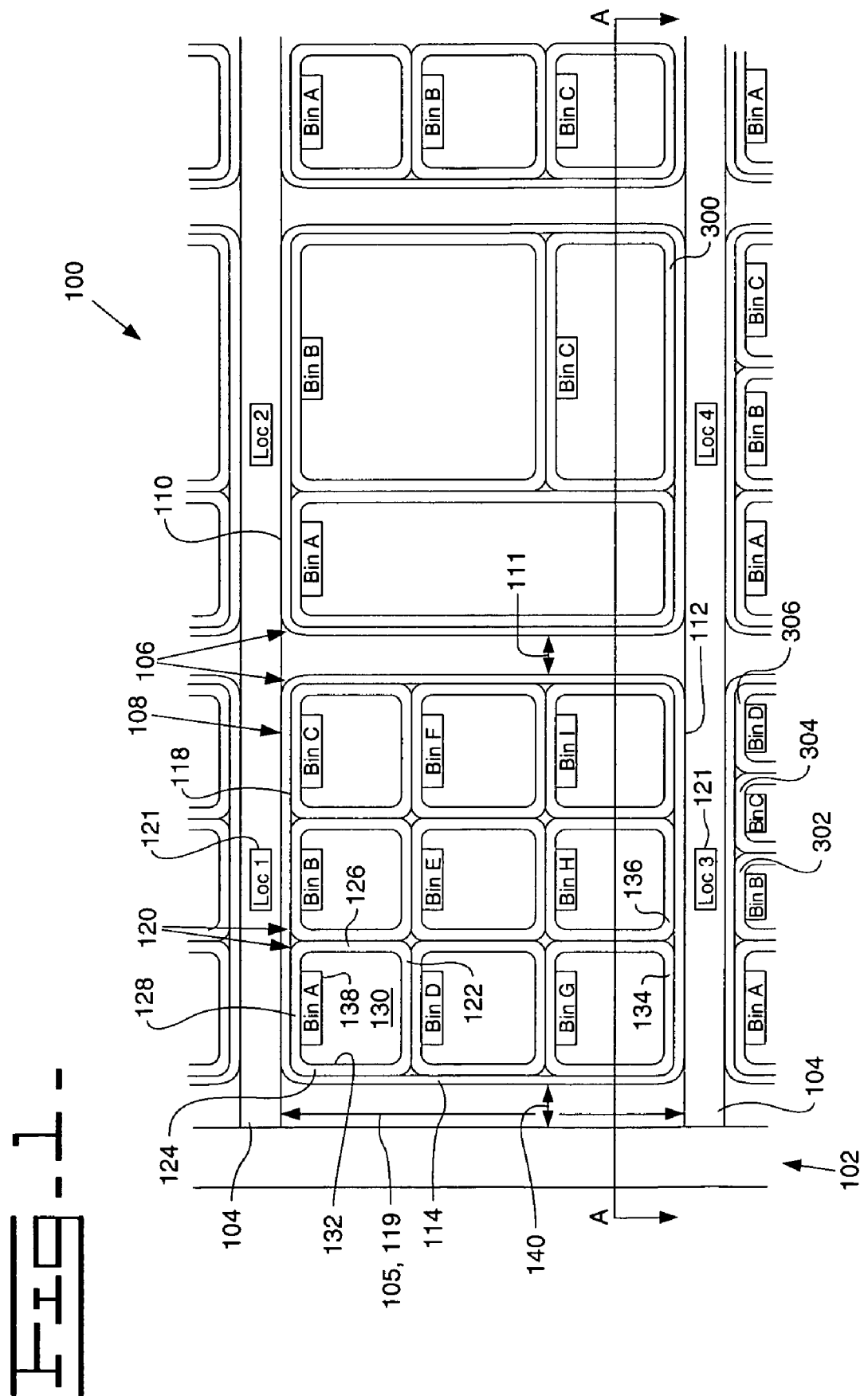

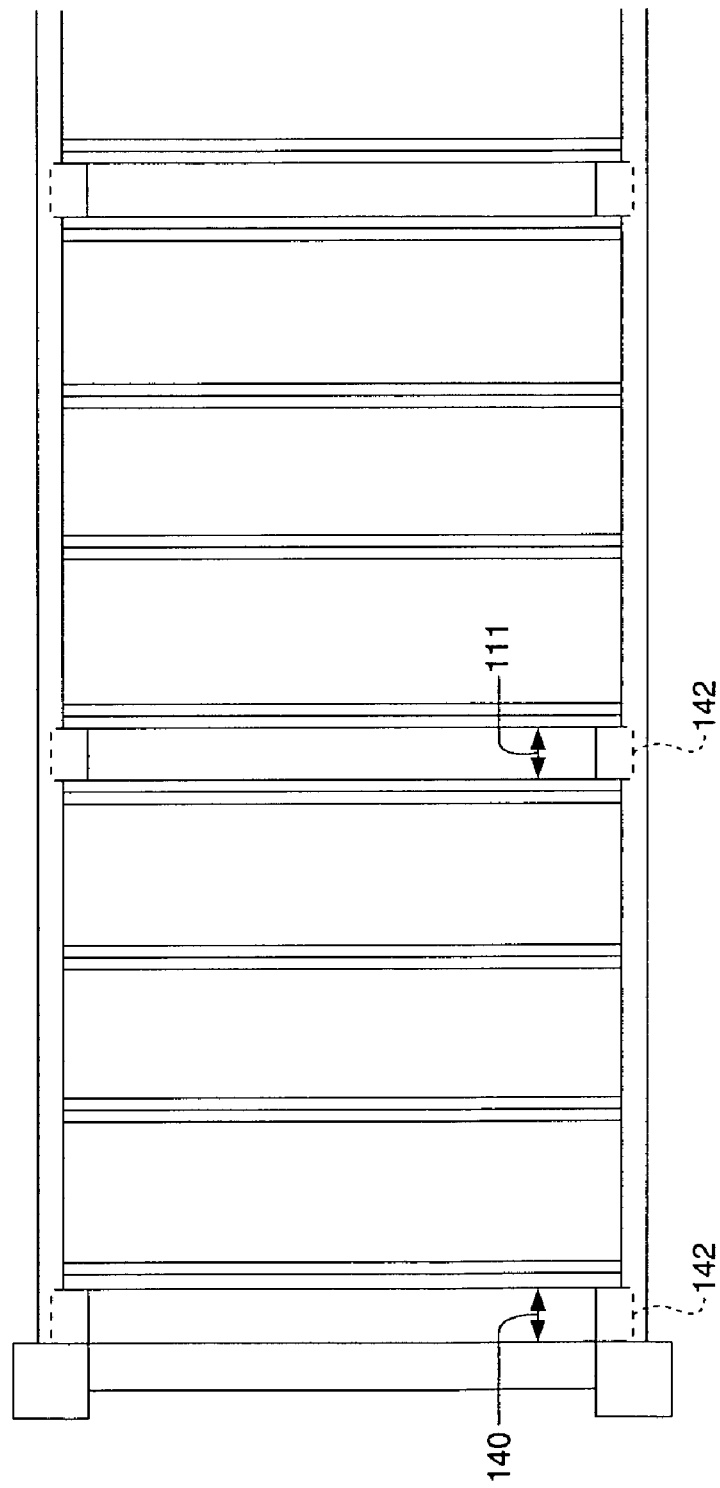

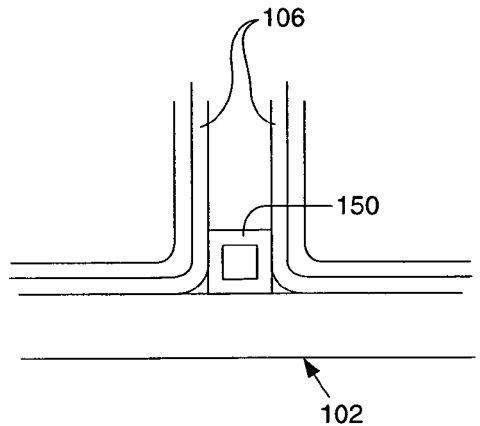
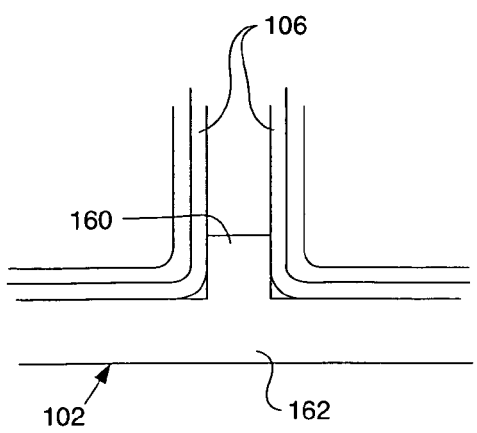
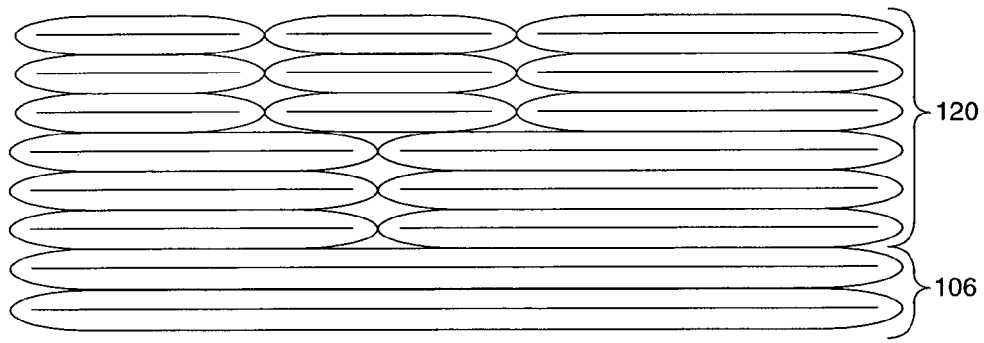
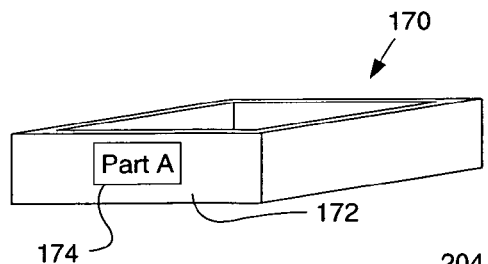
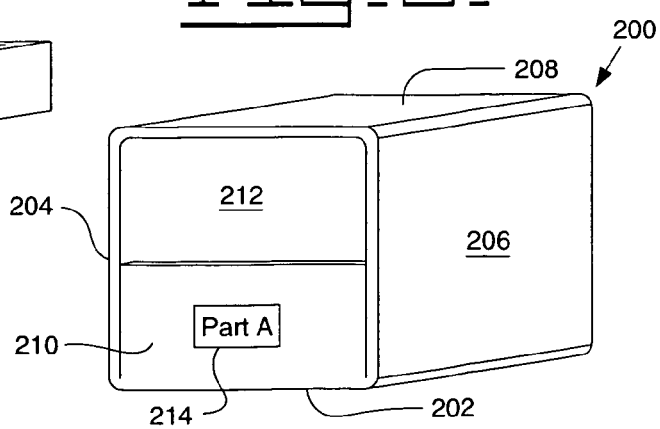

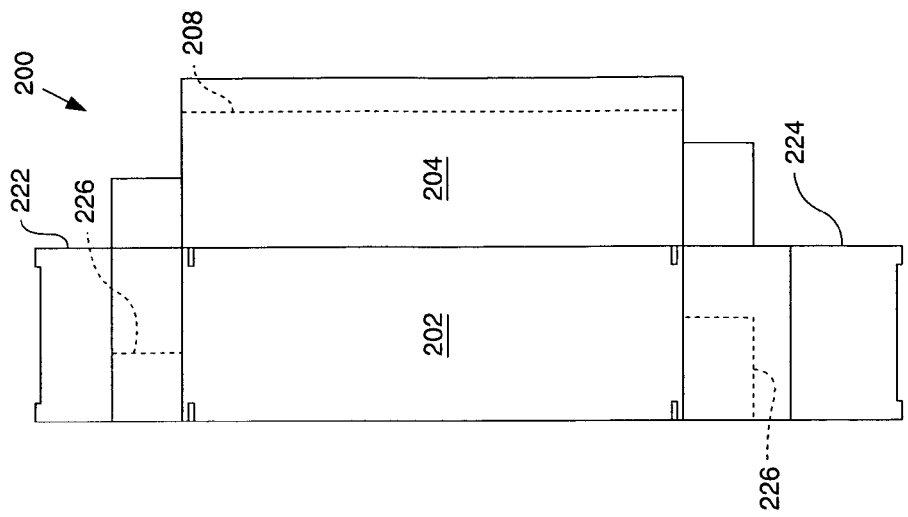
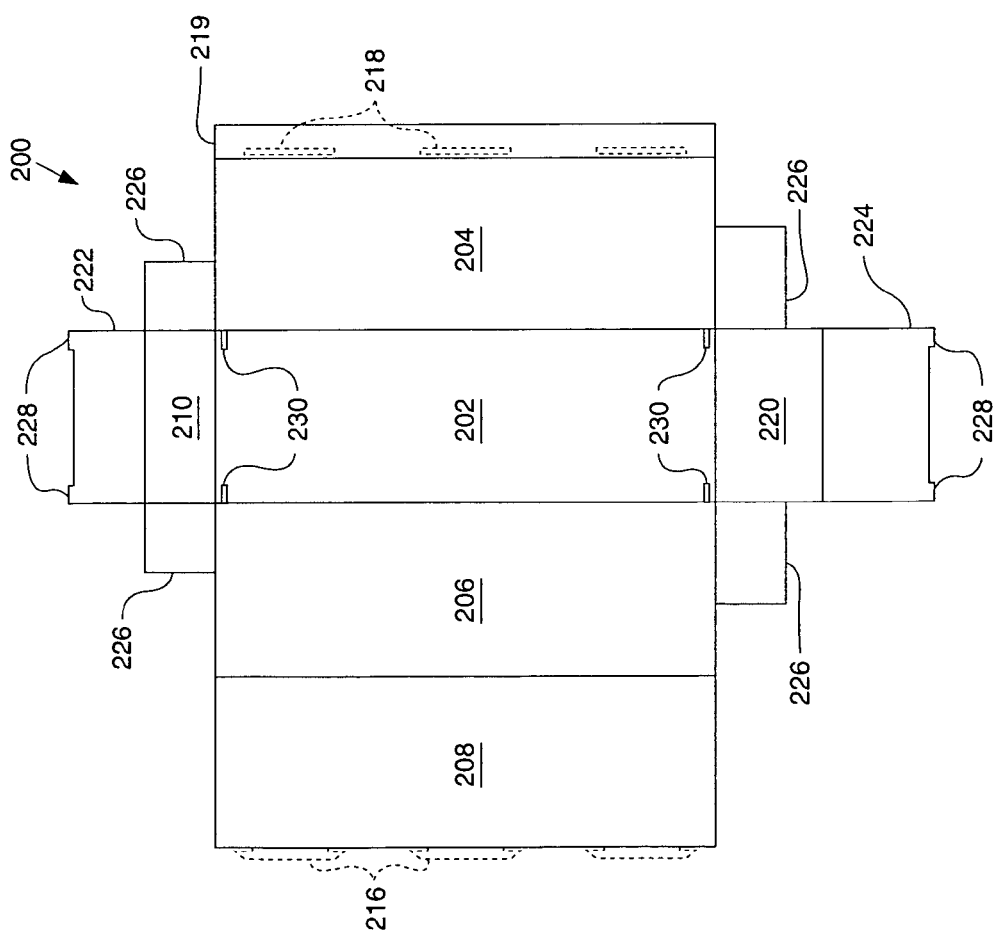

INVENTORY STORAGE SYSTEM

TECHNICAL FIELD

This invention relates generally to inventory storage systems, and more specifically to storage bins and racks.

BACKGROUND

Inventory storage systems are used within warehouses and manufacturing facilities to organize components, parts, and assemblies for retrieval and storage. Current inventory storage systems utilize multi-platform racks, one-piece dividers, and bins. The bins and one-piece dividers are typically made of formed plastic or metal and are not collapsible. Consequently, the bins and one-piece dividers take up significant storage space when not in use. Additionally, the bins and one-piece dividers tend to be quite expensive.

A drawback of current inventory storage systems is that the racks, dividers, and bins are not modular and making changes may be difficult in order to accommodate changes in inventory populations. For example, new bins, dividers and even racks may need to be ordered. Additionally, long periods of time may be required to disassemble the old inventory storage system and to reassemble the new one in its place. Such changes are costly in materials, time and man power. Consequently, such changes may significantly lower productivity at a facility while the old-system is being replaced.

The present invention is directed to overcome one or more of the problems as set forth above.

SUMMARY OF THE INVENTION

In one example of the present invention, a modular inventory storage system is provided. The inventory storage system may include a frame defining a plurality of storage levels and a first exterior sleeve supported by one of the storage levels, the first exterior sleeve including a bottom wall, a first sidewall, a second sidewall, and a top wall. A first interior sleeve having an opening may be disposed within the first exterior sleeve such that the first interior sleeve abuts at least one of the bottom wall, the first sidewall, the second sidewall, and the top wall. A second interior sleeve may also be disposed within the first exterior sleeve so that the first interior sleeve abuts the first interior sleeve and at least one of the bottom wall, the first sidewall, the second sidewall, and the top wall.

A method for reconfiguring the modular inventory storage system may include the steps of obtaining a first replacement interior sleeve, removing the first and second interior sleeves from within the exterior sleeve, and placing the first replacement interior sleeve within the exterior sleeve.

BRIEF DESCRIPTION OF THE DRAWINGS

FIG. 1 is a front side view of a portion of an inventory storage system.

FIG. 2 is a cross sectional view of the inventory storage system along line A-A of FIG. 1.

FIGS. 3A and 3B are detailed views illustrating spacers for use with the inventory storage system of FIG. 1.

FIG. 4 illustrates potential flat configurations of the exterior sleeves and interior sleeves stacked for storage or shipping.

FIG. 5 illustrates a tray that may be disposed within the interior sleeves shown in FIG. 1.

FIG. 6 illustrates another interior sleeve.

FIG. 7 is a plan view of a potentially recyclable and/or biodegradable construction of the interior sleeve of FIG. 6.

FIG. 8 is a plan view of the interior sleeve of FIGS. 6 and 7 in the flat configuration.

DETAILED DESCRIPTION

FIG. 1 is a front side view illustrating a portion of an inventory storage system 100. As shown, the inventory storage system 100 may include a frame 102 defining a plurality of storage levels 104. Each storage level 104 may be disposed at a predetermined height 105 above a lower storage level 104. The frame 102 may be a storage rack or shelving made of metal, wood, concrete, composite, or any other material known in the art.

As shown, one or more exterior sleeves 106 may be supported by one of the storage levels 104 of the frame 102. For example, a first exterior sleeve 108 and a second exterior sleeve 110 may be attached to the frame 102 via mechanical fasteners and or adhesives (not shown). The first exterior sleeve 108 and the second exterior sleeve 110 may be disposed on the one storage level 104 of the frame 102 such that a gap 111 is provided between them 108, 110.

As shown, the exterior sleeves 106 are disposed in an in-use configuration that includes a bottom wall 112, a first sidewall 114, a second sidewall 116, and a top wall 118. The exterior sleeves 106 may have a height 119 that is equivalent to the height 105 between storage levels 104. Consequently, the frame 102 may abut the top wall 118 and provide additional support to the first sidewall 114 and the second sidewall 116. The bottom wall 112, the first sidewall 114, the second sidewall 116, and the top wall 118 support and position a plurality of removable interior sleeves 120.

A location tag 121 that may be disposed on the frame 102 near specific exterior sleeves 106 to identify specific exterior sleeves 106. The location tag 121 may be magnetically attached to the frame 102 or may be attached by an adhesive or mechanical fastener. Alternatively, the location tag 121 may include an radio frequency identification (RFID) tag to facilitate the locating of a specific exterior sleeve 106.

The plurality of interior sleeves 120 each include a bottom wall 122, a first sidewall 124, a second sidewall 126, and a top wall 128 that define an interior space 130 for storing components, parts, assemblies, and completed products (not shown). The interior sleeves 120 have an opening 132 for accessing the interior space 130 from a front side of the inventory storage system 100.

The interior sleeves 120 may be disposed within the exterior sleeves 106 such that a first interior sleeve 134 and a second interior sleeve 136 abut at least one of each other or another interior sleeve 120 and/or an interior side of the bottom wall 112, the first sidewall 114, the second sidewall 116, or the top wall 118 of one of the exterior sleeves 106.

The interior sleeves 120 may include an identification tab 138 to facilitate the locating of a specific interior sleeve 120 within a specific exterior sleeve 106. The identification tab 138 may be integrally formed with the interior sleeves 120 as a cut in the top wall 128 or may be attached with an adhesive or mechanical fastener.

The exterior sleeves 106 and the interior sleeves 120 may be made of a corrugated material or a solid wall material. More specifically, the exterior sleeves 106 and the interior sleeves 120 may be made of plastic, paper, or a composite. In some configurations, the exterior sleeves 106 and the interior sleeves 120 may be made of recyclable or biodegradable materials such as a recyclable or biodegradable cellulosic material, such as paper, and may include a recyclable or biodegradable adhesive, such as a high or low density polyethylene.

Referring to FIG. 2, a cross sectional view along line A-A of FIG. 1 illustrates the gap 111 between the first exterior sleeve 108 and the second exterior sleeve 110. A gap 140 may also be provided between the first exterior sleeve 108 and the frame 102. The gaps 111 and 140 may facilitate the distribution of water from an automatic sprinkler (not shown) disposed above the inventory storage system 100. Additionally, gaps 111 and 140 may facilitate airflow through a facility and prevent the buildup of fumes from solvents, paints, oils, and other materials that may be found on components, parts, assemblies, and complete products stored within the inventory storage system 100.

As shown in phantom line, optional spacers 142 may be disposed to maintain the gaps 111 and 140. In some configurations, the spacers 142 may be attached to the first and/or second exterior sleeves 108, 110 by an adhesive or mechanical fastener. Alternatively, the spacers 142 may be integrally formed with the exterior sleeves 106.

Referring to FIGS. 3A and 3B, detailed views illustrate alternative spacers 150, 160 for use with the inventory storage system 100 of FIG. 1. The spacers 150 may be hollow sleeves made of the same material as the exterior sleeves 106. The spacers 150 may be slide into place between the exterior sleeves 106 or may be integrally formed with exterior sleeves 106.

The spacer 160 may be attached to a cross arm 162 of the frame 102 through adhesives, welding or mechanical fasteners. Alternatively, the spacer 160 may be integrally formed with the cross arm 162 of the frame 102 as a unitary body.

Referring to FIG. 4, a flat configuration of the exterior sleeves 106 and interior sleeves 120 is illustrated. The flat configuration requires little space in comparison to the in-use configuration and permits the exterior sleeves 106 and interior sleeves 120 of FIG. 1 to be stacked for storage or shipping. Furthermore, because of the generally rectangular sleeve design, the exterior sleeves 106 and interior sleeves 120 may be quickly moved between the flat configuration and the in-use configuration, while preserving the structural strength of the exterior sleeves 106 and interior sleeves 120.

Additionally, because the exterior sleeves 106 and interior sleeves 120 may be made of relatively lightweight materials, such as plastic, composite, and paper, these components of the inventory storage system 100 may be inexpensive to manufacture and ship and may be positioned without the need for mechanized assistance.

Referring to FIG. 5, a tray 170 may be placed inside one of the interior sleeves 120 to provide added weight capacity and to provide a front wall 172 to contain small parts. The tray 170 may also include a label 174 for identification. The tray 170 may be removed or slid out of one of the interior sleeves 120 to facilitate part picking operations.

Referring to FIG. 6, a perspective view illustrates another interior sleeve 200 that may be used in place of the interior sleeves 120 shown in FIG. 1. To replace one or more of the interior sleeves 120, such as the first and second interior sleeves 134, 136 of FIG. 1, the one interior sleeve 120 may be slid out of the exterior sleeve 106 and the interior sleeve 200 slid into place within the exterior sleeve 106 of FIG. 1.

As shown, the interior sleeve 200 may include a bottom wall 202, a first sidewall 204, a second sidewall 206, and a top wall 208. The interior sleeve 200 may also include a front wall 210 partially blocking a front opening 212 of the interior sleeve 200 and a rear wall (shown in FIG. 7). An identification tag 214 may be attached to the front wall 210.

Referring to FIG. 7, a plan view illustrates a potentially recyclable and/or biodegradable construction of the interior sleeve 200 of FIG. 6. The interior sleeve 200 may be manufactured from a single sheet of material in a single stamping operation, which minimizes its overall cost. Additionally, the interior sleeve 200 may be made entirely of a unitary sheet of solid or corrugated plastic, composite, or paper, which facilitates recycling.

As shown, the top wall 208 of the interior sleeve 200 may be attached to the first sidewall 204 by integrally formed inserts 216 being inserted into receiving slots 218 shown in phantom line and formed in an attachment tab 219. Alternatively, the top wall 208 of the interior sleeve 200 may be attached to the first sidewall 204 by an adhesive, which may be a recyclable or biodegradable adhesive, disposed on the attachment tab 219. Additionally, the top wall 208 of the interior sleeve 200 may be attached to the first sidewall 204 by mechanical fasteners, such as staples or rivets, connecting the top wall 208 with the attachment tab 219 of the first sidewall 204.

The front wall 210 and a rear wall 220 may be formed by folding a front wall tab 222 and a rear wall tab 224 over respective sidewall tabs 226 to insert locking ears 228 into a respective slot 230. As shown, the front wall 210 and the rear wall 220 may be the same height or may have different heights to provide two options to partially block the front opening 212 or may be the same height. Additionally, the rear wall 220 may completely cover a rear opening (not shown). Further, the rear wall 220 may be formed from four flaps attached together similarly to standard packing boxes with an adhesive, tape, or mechanical fasteners.

Once the locking ears are disposed in the slots 230, the front and rear walls 210, 220 may partially block a respective front opening 212 and rear opening (not shown) to prevent components, parts, assemblies, and complete products (not shown) stored within the interior sleeves 200 from falling out. By folding the front wall tab 222 and the rear wall tab 224 over respective sidewall tabs 226, the structural stability and strength of the interior sleeve 200 may be increased.

FIG. 8 is a plan view of the interior sleeve 200 of FIGS. 6 and 7 in the flat configuration. As shown, the top wall 208 is attached to the first sidewall 204 and the front and rear wall tabs 222, 224 have been unfolded. Additionally, the top wall 208, the second sidewall 206, and the respective sidewall tabs 226 have been folded behind the bottom wall 202 and the first sidewall 204. Consequently, the interior sleeve 200 in the flat configuration takes up less space than the in-use configuration and thus, may be more easily shipped or stored.

INDUSTRIAL APPLICABILITY

The modular inventory storage system may be easily modified to accommodate changes in inventory stock levels. For example, once a desired replacement interior sleeve is obtained, one or more interior sleeves may be removed to accommodate the replacement interior sleeve. Then, the replacement interior sleeve is placed within the exterior sleeve. Additionally, the inventory stock records may be updated to indicate the change.

In a more specific example, the first and second interior sleeves 134, 136 may be replaced by an third interior sleeve 300 found in the second exterior sleeve 110 of FIG. 1, which is sized to replace the smaller first and second interior sleeves 134, 136.

Once the first and second interior sleeves 134, 136 are removed, they may be placed in the flat configuration. Alternatively, first and second interior sleeves 134, 136 may be placed in the second exterior sleeve 110 to take the place of the third interior sleeve 300.

In an alternative example, a fourth, fifth, and sixth interior sleeves 302, 304, 306 may replace the first and second interior sleeves 134, 136 to provide smaller bins as needed to accommodate inventory stock changes.

The inventory storage system may be quickly and inexpensively reconfigured to meet the changing needs of manufacturing and storage facilities. Specifically, the interior sleeves can be quickly changed with interior sleeves that are larger or smaller in order to make better use of the space within exterior sleeves. Once removed, the interior sleeves may be collapsed into a folded configuration for storage for use at a later time or for shipping to be used at another facility. When the stored interior sleeves are needed for use, they can be quickly formed into the in-use configuration.

The exterior sleeves support the interior sleeves and may be positioned to provide gaps for improved air and fluid flow through the inventory storage system. Lastly, the inventory storage system may be of an environmentally friendly design that can be reused, recycled, or biodegradable. Additionally, because the exterior sleeves support a plurality of interior sleeves in a static configuration and each interior sleeve is capable of supporting other interior sleeves, vertical dividers between the interior sleeves are not needed, which saves additional space, cost, and deployment time over currently available inventory storage systems. In some configurations, a horizontal divider may be used to increase the strength of the bottom walls of the interior sleeves.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. An inventory storage system, comprising:
a frame defining a plurality of storage levels;
a first exterior sleeve supported by one of the storage levels, the first exterior sleeve including a bottom wall, a first sidewall, a second sidewall, and a top wall;
a first interior sleeve having an opening, the first interior sleeve disposed within the first exterior sleeve, the first interior sleeve abutting at least one of the bottom wall, the first sidewall, the second sidewall, and the top wall;
a second interior sleeve disposed within the second exterior sleeve, the first interior sleeve abutting the first interior sleeve and at least one of the bottom wall, the first sidewall, the second sidewall, and the top wall;
a second exterior sleeve supported by the one storage level, the second exterior sleeve being disposed on the one storage level to provide a fluid flow gap between the second exterior sleeve and the first exterior sleeve; and
a spacer that is disposed between the first and second exterior sleeves to maintain the fluid flow gap between the second exterior sleeve and the first exterior sleeve, the spacer being attached to the frame wherein the fluid flow gap allows for fumes to dissipate, and water or other fire suppressants to access the inventory storage system in a large warehouse or manufacturing facility.

2. The inventory storage system of claim 1, further comprising a first tray and a second tray disposable within the respective first and second interior sleeves.

3. The inventory storage system of claim 1, wherein the first exterior sleeve and the first and second interior sleeves have a flat configuration and an in-use configuration.

4. The inventory storage system of claim 1, wherein the first and second interior sleeves each include a front wall partially blocking a front opening of the first and second interior sleeves.

5. The inventory storage system of claim 1, wherein the first and second interior sleeves each include a rear wall partially blocking a rear opening of the first and second interior sleeves.

6. The inventory storage system of claim 1, wherein the first exterior sleeve and the first and second interior sleeves are made of a corrugated material.

7. The inventory storage system of claim 6, wherein the first exterior sleeve and the first and second interior sleeves are made of paper.

8. The inventory storage system of claim 6, wherein the first exterior sleeve and the first and second interior sleeves are made of biodegradable materials.

9. A method for updating an inventory storage system including a frame defining a plurality of storage levels, a first exterior sleeve supported by one of the storage levels, a second exterior sleeve supported by the storage level, a first interior sleeve, and second interior sleeve, the first and second interior sleeves disposed within the first exterior sleeve and each abutting the other and at least one of a bottom wall, a first sidewall, a second sidewall, and a top wall of the first exterior sleeve, the method comprising:
positioning the first exterior sleeve on the storage level;
attaching a spacer to the storage level proximate to and in engagement with the first exterior sleeve;
positioning the second exterior sleeve on the storage level proximate to and in engagement with the spacer, the spacer forming a fluid flow gap between the first and second exterior sleeves wherein the fluid flow gap allows for fumes to dissipate, and water or other fire suppressants to access the inventory storage system in a large warehouse or manufacturing facility;
obtaining a first replacement interior sleeve;
removing the first and second interior sleeves from within the first exterior sleeve; and
placing the first replacement interior sleeve within the first exterior sleeve.

10. The method of claim 9, wherein the first and second interior sleeves have a flat configuration and an in-use configuration, the method further comprising the step of placing the first and second interior sleeves in the flat configuration.

11. The method of claim 9, wherein the first replacement interior sleeve is sized to replace at least the first and second interior sleeves.

12. The method of claim 9, further comprising the steps of obtaining a second replacement interior sleeve and a third replacement interior sleeve, and placing the second and third replacement interior sleeves within the first exterior sleeve.

13. The method of claim 12, wherein the first, second, and third replacement interior sleeves are sized to replace at least the first and second interior sleeves.

14. The method of claim 12, wherein the first exterior sleeve and the first and second interior sleeves are made of a corrugated material.

15. The method of claim 12, wherein the first exterior sleeve and the first and second interior sleeves are each made of paper.

16. The method of claim 12, wherein the first exterior sleeve and the first and second interior sleeves are made of a biodegradable material.

* * * * *

UNITED STATES PATENT AND TRADEMARK OFFICE
CERTIFICATE OF CORRECTION

| | | |
|---|---|---|
| PATENT NO. | : 7,850,258 B2 | |
| APPLICATION NO. | : 11/640578 | |
| DATED | : December 14, 2010 | |
| INVENTOR(S) | : Hupke | |

It is certified that error appears in the above-identified patent and that said Letters Patent is hereby corrected as shown below:

Please correct the Claims as follows:

Column 5, line 45, in Claim 1, delete "the second exterior" and insert -- the first exterior --.

Column 5, line 46, in Claim 1, delete "the first interior" and insert -- the second interior --.

Column 5, line 57, in Claim 1, delete "frame wherein" and insert -- frame; wherein --.

Column 6, line 33, in Claim 9, delete "sleeves wherein" and insert -- sleeves; wherein --.

Signed and Sealed this
Thirty-first Day of January, 2012

David J. Kappos
*Director of the United States Patent and Trademark Office*